United States Patent [19]
Akimoto et al.

[11] Patent Number: 5,602,610
[45] Date of Patent: Feb. 11, 1997

[54] SHUTTER FOR CAMERA

[75] Inventors: Kazuo Akimoto; Miyoshi Tanikawa; Nobuyuki Fukui, all of Yotsukaido, Japan

[73] Assignee: Seiko Precision Inc., Tokyo, Japan

[21] Appl. No.: 365,089

[22] Filed: Dec. 28, 1994

[30] Foreign Application Priority Data

Dec. 28, 1993 [JP] Japan ................... 5-336598

[51] Int. Cl.⁶ ................ G03B 9/08; G03B 9/10
[52] U.S. Cl. ............ 396/449; 396/463; 396/493; 396/495; 396/246
[58] Field of Search ............... 354/230, 234.1, 354/250, 254, 264, 435, 439

[56] References Cited

U.S. PATENT DOCUMENTS

| | | | |
|---|---|---|---|
| 4,527,876 | 7/1985 | Tanaka et al. | 354/229 |
| 4,791,442 | 12/1988 | Touma et al. | 354/234.1 |
| 4,797,700 | 1/1989 | Tsuji et al. | 354/271.1 |
| 4,987,435 | 1/1991 | Touma et al. | 354/195.11 |
| 5,155,522 | 10/1992 | Castor et al. | 354/456 |
| 5,159,382 | 10/1992 | Lee et al. | 354/435 |
| 5,255,037 | 10/1993 | Kobayashi | 354/229 |
| 5,258,797 | 11/1993 | Oyoshi et al. | 354/400 |

*Primary Examiner*—Safet Metjahic
*Assistant Examiner*—Eddie C. Lee
*Attorney, Agent, or Firm*—Amster, Rothstein & Ebenstein

[57] ABSTRACT

When a driving member is rotated counterclockwise by a single motor with a pair of sectors biased in the closing direction by a biasing spring, a first driving pin causes an operating lever to rotate clockwise. The pair of sectors pivot in opposite directions to each other in association with the driving lever to reach a first position where the sectors are fully open without overlapping the lens opening. When the driving member is rotated clockwise, a second driving pin also causes the operating lever to rotate clockwise. The pair of sectors pivot in opposite directions to each other to reach a second position, that is, a half-open position where an opening smaller than the lens opening is obtained. At this time, The second driving pin abuts on a part of one sector to restrain the displacement of the driving member. Accordingly, the driving member is prevented from overrunning, and no hunting occurs.

4 Claims, 3 Drawing Sheets

SHUTTER FOR CAMERA

BACKGROUND OF THE INVENTION

1. Field of the Invention

The present invention relates to a shutter for use in a camera.

2. Description of the Related Art

Conventional shutters which have been widely used in compact cameras are designed to use a single shutter speed and enable the aperture of the exposure opening to change between two levels in accordance with the change of ISO sensitivity, ambient brightness, etc. To obtain two different levels of aperture, the conventional practice is to provide two different levels for the amount of rotation of a pulse motor, or to prepare two driving motors for two different aperture levels. A shutter mechanism has recently been proposed which has a plurality of shutter blades provided with first and second opening forming portions so that when a motor is rotated in a first direction, a lens opening is formed by the first opening forming portions, whereas, when the motor is rotated in a second direction, a lens opening having a different aperture is formed by the second opening forming portions [see Japanese Patent Laid-Open (KOKAI) No.04-116533 (1992)].

In a case where the pulse motor is controlled so as to provide two different amounts of rotation as in the conventional shutters, however, when the motor is stopped with the shutter opening set to the first aperture level, hunting occurs, which makes it difficult to effect exposure control. When two pulse motors are used, the number of parts increases, resulting in an increase of the cost.

In contrast, the shutter mechanism, in which two different opening forming portions are provided and a motor is selectively rotated in forward and backward directions, is free from the problems of hunting and cost. On the other hand, since the shutter blades are adapted to reciprocate in two directions with respect to the lens opening, the space required for the movement of the shutter blades increases, which is an obstacle to reduction in the overall size of the camera.

SUMMARY OF THE INVENTION

It is an object of the present invention to provide a shutter for a camera at reduced cost, which is driven by a single motor and has two levels of exposure opening and which prevents the occurrence of hunting and needs no excess space, thereby enabling reduction in the overall size of the camera.

To attain the above-described object, the present invention provides a shutter for a camera including a pair of sectors supported on a shutter base plate so as to open and close an opening formed in the shutter base plate in association with each other. The sectors are biased in a closing direction by a biasing spring. The shutter further includes a driving member rotationally displaced in both forward and backward directions in response to rotation of a single reversible motor, and an operating lever pivoted in a direction for opening the sectors regardless of the direction of rotational displacement of the driving member. One of the sectors is connected to the operating lever so as to pivot together with it as one unit. The driving member has first and second driving pins respectively provided on both end portions thereof. The first driving pin is adapted to engage the operating lever when the motor is driven in one direction, thereby displacing the operating lever to a first position. The second driving pin is adapted to engage the operating lever when the motor is driven in the other direction, thereby displacing the operating lever to a second position. When the operating lever is in the first position, the pair of sectors are in a full-open position where the sectors do not overlap the opening, whereas widen the operating lever is in the second position, the pair of sectors are in a half-open position where an opening smaller than the above-described opening is obtained. At least the second driving pin is adapted to abut on a part of the other of the sectors when the driving member is driven to displace the operating lever to the second position, thereby restraining the displacement of the driving member.

With the above-described arrangement of the present invention, when the driving member is rotated counterclockwise by the single motor in a state where the pair of sectors are biased in the closing direction by the biasing spring, the first driving pin causes the operating lever to rotate clockwise. The pair of sectors pivot in opposite directions to each other in association with the driving lever to reach the first position. As a result, the sectors are fully open without overlapping the opening. When the driving member is rotated clockwise, the second driving pin also causes the operating lever to rotate clockwise. As a result, the pair of sectors pivot in opposite directions to each other to reach the second position, that is, a half-open position where an opening smaller than the above-described opening is obtained. At this time, the second driving pin abuts on a part of one sector to restrain the displacement of the driving member. Accordingly, the driving member is prevented from overrunning, and no hunting occurs.

BRIEF DESCRIPTION OF THE DRAWINGS

The above and other objects, features and advantages of the present invention will become more apparent from the following description of a preferred embodiment thereof, taken in conjunction with the accompanying drawings, in which like reference numerals denote like elements, and of which.

DESCRIPTION OF THE PREFERRED EMBODIMENTS

One embodiment of the present invention will be described below in detail with reference to the accompanying drawings.

Figure 1:
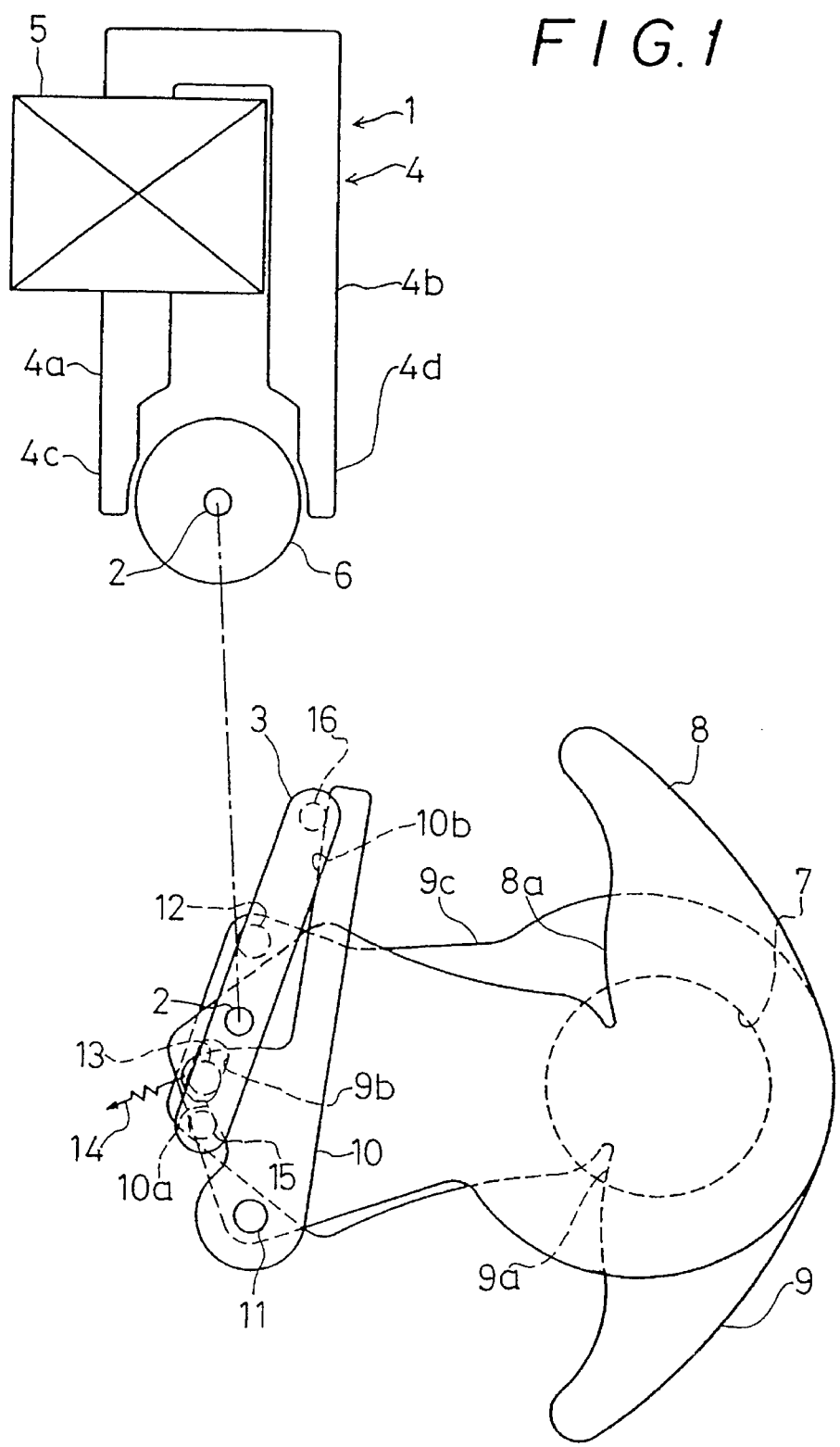
FIG. 1 is a fragmentary plan view showing an initial state of one embodiment of the present invention.

FIG. 1 shows an essential part of one embodiment of the present invention which is in an initial state. A rotor shaft 2, which constitutes a motor 1 shown in the upper left part of the figure, is united with a driving shaft for rotating a driving member 3 (described later), which is shown in the lower part of the figure.

The motor 1 is secured to a shutter base plate (not shown). The motor 1 has a coil 5 wound around one leg portion 4a of a bifurcated stator 4. The distal end portions of the leg portions 4a and 4b of the stator 4 are cut at the inner sides thereof so as to widen the spacing therebetween, thereby forming pole port;ions 4c and 4d. Between the pole portions 4c and 4d, a four-pole rotor 6 is rotatably provided through the rotor shaft 2. The motor 1 is a reversible motor in which the direction of rotation of the rotor 6 can be reversed by changing the polarity of current supplied to the coil 5. The rotor 6 is capable of rotating by a predetermined amount in a designated direction in response to a signal sent from a CPU (not shown).

As shown in the lower part of FIG. 1, the driving member 3 is an elongated plate-shaped member which is rigidly secured to the rotor shaft 2 at, a position which is approximately one third of the entire length of the driving member 3. Accordingly, the driving member 3 can be rotated (pivoted) by the rotor shaft 2.

A shutter operating mechanism is provided in the vicinity of the driving member 3. The shutter operating mechanism has a pair of sectors 8 and 9 which are provided at one end of a lens opening 7 provided in the shutter base plate such that the sectors 8 and 9 can pivot in opposite directions to each other. The shutter operating mechanism further has an operating lever 10 for transmitting rotational force from the driving member 3 to the two sectors 8 and 9. The sectors 8 and 9 have semicircular head portions which are to cover the lens opening 7. One side of each head portion extends in a peninsular shape. At a position where the peninsular portion and the trunk portion intersect each other, an inlet-shaped opening forming portion 8a (9a) is provided.

One sector 8 is pivotably supported by the shutter base plate through a support pin 11 at one corner (lower left corner as viewed in FIG. 1) of the trunk portion. Similarly, the other sector 9 is pivotably supported by the shutter base plate through a support pin 12 provided on one corner (upper left corner as viewed in FIG. 1) of the trunk portion.

The support pin 11 of the sector 8 supports not only the sector 8 but also one end portion of the operating lever 10. Thus, the operating lever 10 is supported at one end portion thereof by the support pin 11 of the sector 8. The other end portion of the operating lever 10 extends across the trunk portion of the sector 8 and further extends beyond it. The operating lever 10 has a projection 10a with a gentle slope formed on one side (left-hand side as viewed in FIG. 1) of the end portion thereof which is closer to the support pin 11. A connecting pin 13 is rigidly secured to the distal end portion of the projection 10a for pivoting the sector 9 in association with the sector 8. The connecting pin 13 is engaged with an elongated groove 9b provided in the sector 9 so as to slide along the elongated groove 9b, thereby enabling the sector 9 to pivot in association with the sector 8. The connecting pin 13 is also engaged with a through-hole provided in the projection 10a of the operating lever 10, thereby enabling the two sectors 8 and 9 and the operating lever 10 to rotate in linked relation to each other.

A biasing spring 14 is engaged with the connecting pin 13. Thus, the two sectors 8 and 9 are biased in a closing direction by the resilient force of the biasing spring 14. Accordingly, in the initial position the two sectors 8 and 9 can be maintained in a state where the sectors 8 and 9 completely close the opening 7.

In the initial state of the shutter, the driving member 3 lies approximately parallel to the operating lever 10 such that one end of the driving member 3 lies in the vicinity of the distal end of the operating lever 10, and the other end of the driving member 3 lies in the vicinity of the lower slope of the projection 10a of the operating lever 10. The two end portions of the driving member 3 are respectively provided with driving pins 15 and 16 which can abut on one side (left-hand side as viewed in FIG. 1) of the operating lever 10. When the driving member 3 rotates counterclockwise, one driving pin 15 abuts on the lower slope of the projection 10a of the operating lever 10, thereby enabling the operating lever 10 to rotate clockwise. When the driving member 3 rotates clockwise, the other driving pin 16 abuts on an abutment portion 10b disposed at the distal end of the operating lever 10, thereby enabling the operating lever 10 to rotate also clockwise.

The operation of the embodiment will be explained below.

As shown in FIG. 1, in the initial position the pair of sectors 8 and 9 are maintained in a state where the sectors 8 and 9 fully close the opening 7 by the resilient force of the biasing spring 14, as has already been described above.

When the view finder of the camera is directed at a subject under conditions where the surroundings are not very bright by using a film of ordinary ISO sensitivity, the CPU built in the camera decides exposure conditions from the photographing conditions, which are detected by a sensor, and thus determines a degree of opening. If the CPU decides that the degree of opening should be "fully open", the direction of rotation of the motor 1 is decided to be counterclockwise.

Figure 2:
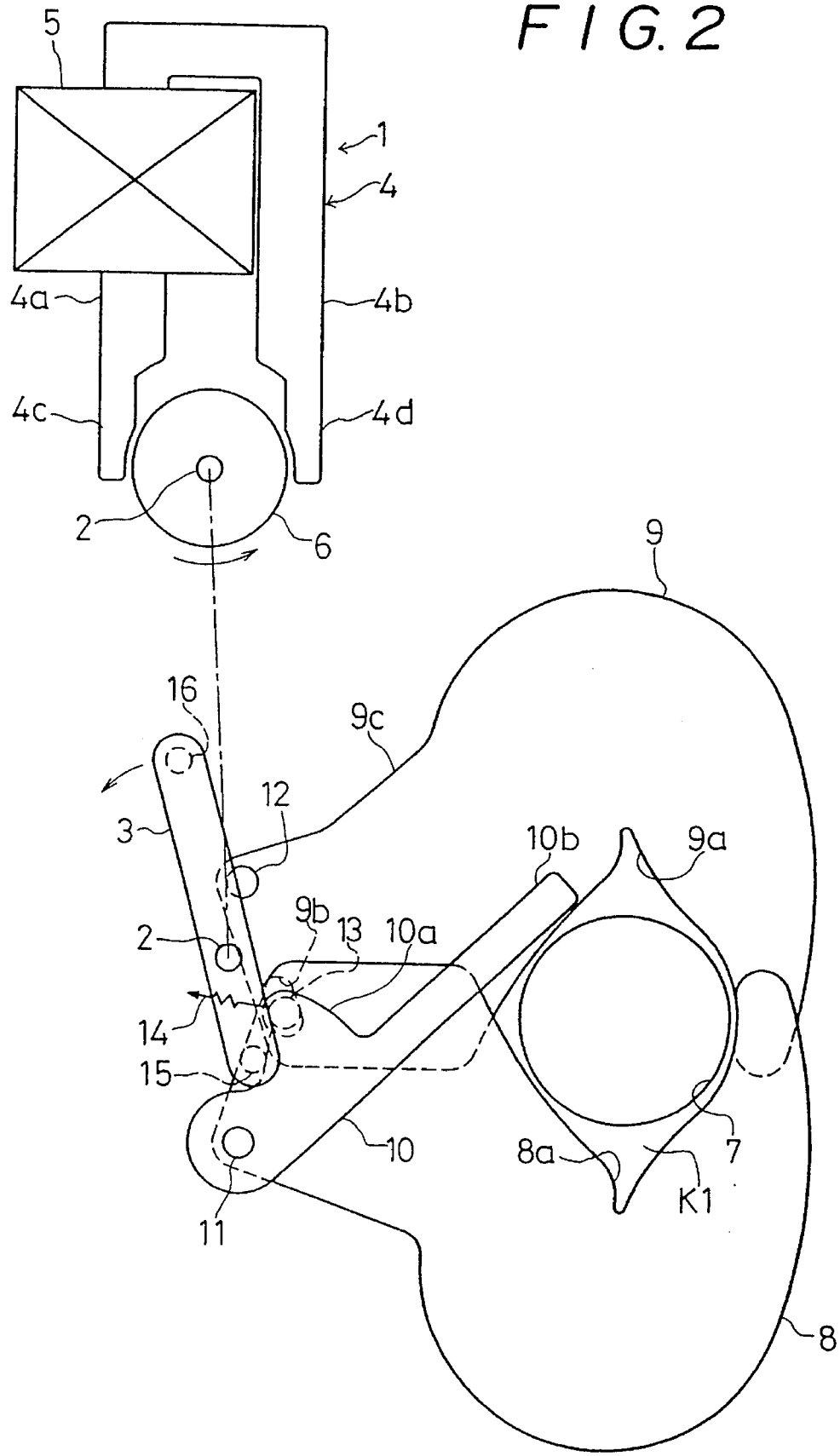
FIG. 2 is a fragmentary plan view of one embodiment of the present invention, showing a state where an operating lever is in a first position.

When a release operation is performed with the subject put within the finder field of view under these conditions, the CPU delivers a signal, causing the motor 1 to rotate counterclockwise. The counterclockwise rotation of the motor 1 causes the driving member 3 to rotate counterclockwise through the rotor shaft 2. Consequently, the first driving pin 15 of the driving member 3 abuts and presses on the lower slope of the projection 10a of the operating lever 10, causing the operating lever 10 to rotate clockwise. The sector 8 also rotates clockwise, together with the operating lever 10, about the support shaft 11 against the biasing force of the biasing spring 14. In association with the rotation of the sector 8, the sector 9 rotates counterclockwise about the support shaft 12 through the engagement of the connecting pin 13 with the elongated groove 9b. As a result, the two sectors 8 and 9 open, forming an exposure opening K1 larger than the lens opening 7, as shown in FIG. 2. When the exposure opening K1 reaches the full-open position, the rotation of the driving member 3 is stopped by a stopper (not shown), and after a predetermined exposure time has elapsed, the supply of current to the coil 5 is suspended. As a result, the two sectors 8 and 9 are released from the force acting thereon so that they are fully open. Accordingly, the two sectors 8 and 9 return to the initial position by the restoring force of the biasing spring 14.

When the view finder is directed at a subject in a bright place, exposure conditions are determined by the CPU from the relationship between the ISO sensitivity of the film used and the ambient brightness. As a result, a degree of opening which corresponds to "half open" is selected (see FIG. 3).

Figure 3:
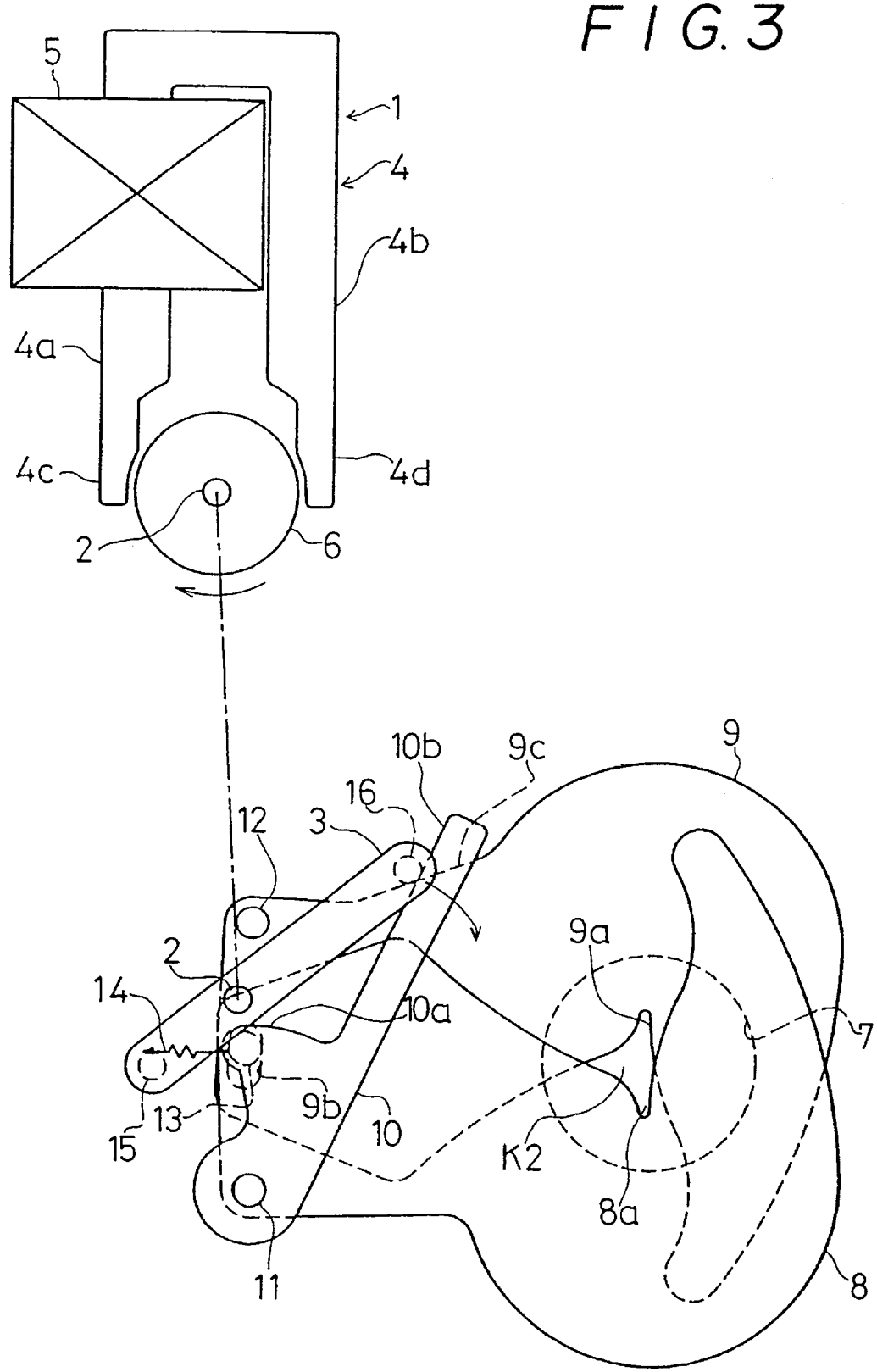
FIG. 3 is a fragmentary plan view of one embodiment of the present invention, showing a state where the operating lever is in a second position.

When a release operation is performed with the subject put within the finder field of view under these conditions, the coil 5 is energized, and the rotor 6 of the motor 1 rotates clockwise. Consequently, the driving member 3 rotates clockwise through the rotor shaft 2. The clockwise rotation of the driving member 3 causes the driving pin 16 provided on one end thereof to abut on the abutment portion 10b formed on one side of the operating lever 10, thus causing the operating lever 10 to rotate clockwise about the support shaft 11 against the biasing force of the biasing spring 14. As a result, the sector 8 also rotates clockwise, together with the operating lever 10. At the same time, the sector 9 rotates counterclockwise through the engagement of the connecting pin 13 with the elongated groove 9b. Thus, a "half-open" exposure opening K2 is formed in the center of the lens opening 7, as shown in FIG. 3.

When the exposure opening K2 reaches a predetermined size, the second driving pin 16 abuts on an abutment portion 9c formed on one side of the sector 9, thereby preventing the driving member 3 from rotating any more. The time interval from the moment the rotation of the driving member 3 stops to the moment the motor 1 stops is controlled by the CPU, thus enabling a correct exposure to be automatically set. As the motor 1 stops, the two sectors 8 and 9 return to the initial position (see FIG. 1) by the restoring force of the biasing spring 14. Since the displacement of the driving member 3 can be restrained by the driving pin 16 when the pair of sectors 8 and 9 reach the second position, each sector can stop at a regular position without overrun. Accordingly, correct exposure conditions can be obtained.

According to the present invention, a pair of sectors are moved only in one direction with respect to the exposure opening by a single motor. Therefore, no wide space is needed for withdrawal of the sectors. Thus, it is possible to reduce the overall size and cost of the camera.

In addition, when the sectors are to be stopped in a halfway position to make the shutter half open, for example, a driving pin that is provided on the driving member abuts on a part of one sector, thereby restraining the displacement of the driving member. Accordingly, it is possible to prevent overrun of the sectors and eliminate the occurrence of hunting and hence possible to set highly accurate exposure conditions. It is also possible to prevent bound of the sectors which might otherwise be caused by play between the members.

Although the present invention has been described through specific terms, it should be noted here that the described embodiment is not necessarily exclusive and that various changes and modifications may be imparted thereto without departing from the scope of the invention which is limited solely by the appended claims.

What is claimed is:

1. A shutter for a camera, comprising:

a pair of sectors supported on a shutter base plate so as to open and close an opening formed in said shutter base plate in association with each other, said pair of sectors being biased in a closing direction by a biasing spring;

a single reversible motor;

a driving member rotationally displaced in both forward and backward directions in response to rotation of said motor; and an operating lever pivoted in a direction for opening said sectors regardless of the direction of rotational displacement of said driving member;

one of said sectors being connected to said operating lever so as to pivot together with said operating lever as one unit;

said driving member having first and second driving pins respectively provided on both end portions thereof, said first driving pin being adapted to engage said operating lever when said motor is driven in one direction, thereby displacing said operating lever to a first position, and said second driving pin being adapted to engage said operating lever when said motor is driven in the other direction, thereby displacing said operating lever to a second position;

said operating lever operating such that when said operating lever is in said first position, said pair of sectors are in a full-open position where said sectors do not overlap said opening, whereas when said operating lever is in said second position, said pair of sectors are in a half-open position where an opening smaller than said opening is obtained; and at least said second driving pin being adapted to abut on a part of one of said sectors when said driving member is driven to displace said operating lever to said second position, thereby restraining the displacement of said driving member.

2. A shutter for a camera, comprising:

a pair of sectors supported for movement on a shutter base plate so as to cover and uncover an opening formed in said shutter base plate, said sectors being biased towards a closed position covering said opening in said shutter base plate, said sectors having a first open position uncovering a first predetermined portion of said opening, and a second open position uncovering a second predetermined portion of said opening;

a reversible motor;

a driving member rotationally displaced in both forward and backward directions in response to rotation of said motor in clockwise and counterclockwise directions, respectively;

associated with said driving member and with said sectors, an operating lever pivotable in a direction for opening said sectors regardless of the direction of rotational displacement of said driving member, wherein said driving member is provided with a fulcrum, a first lever arm portion having a first length and a second lever arm portion having a second length, said first lever arm portion adapted to engage a first camming surface of said operating lever to displace said pair of sectors to said first open position when said motor is driven in said counterclockwise direction, and said second lever arm portion adapted to displace said pair of sectors to said second open position when said motor is driven in said clockwise direction.

3. A shutter for a camera, comprising:

a pair of sectors supported for movement on a shutter base plate so as to cover and uncover an opening formed in said shutter base plate, said sectors being biased toward a closed position covering said opening in said shutter base plate, said sectors having a first open position uncovering a first predetermined portion of said opening, and a second open position uncovering a second predetermined portion of said opening;

a reversible motor;

a driving member rotationally displaced in both forward and backward directions in response to rotation of said motor in clockwise and counterclockwise directions, respectively;

associated with said driving member and with said sectors, an operating lever pivotable in a direction for opening said sectors regardless of the direction of rotational displacement of said driving member, said operating lever connected to a first one of said sectors so as to pivot together with said first sector as a unit, wherein said driving member is provided with a first driving pin on a first end portion and a second driving pin on a second end portion thereof, said first driving pin being adapted to engage a first camming surface of said operating lever when said motor is driven in said counterclockwise direction, and said second driving pin being adapted to engage a second camming surface of said operating lever when said motor is driven in said clockwise direction.

4. The shutter of claim 3 wherein at least said second driving pin is adapted to abut on a part of a second one of said sectors when said driving member is driven to displace said sectors to said second position, thereby restraining the displacement of said driving member.

* * * * *